(12) United States Patent
Nishio et al.

(10) Patent No.: US 11,396,120 B2
(45) Date of Patent: Jul. 26, 2022

(54) RUBBER EXTRUSION DEVICE AND METHOD FOR MANUFACTURING RUBBER EXTRUDATE

(71) Applicant: The Yokohama Rubber Co., LTD., Tokyo (JP)

(72) Inventors: Satoru Nishio, Shinshiro (JP); Yuki Furubayashi, Shinshiro (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 333 days.

(21) Appl. No.: 16/486,795

(22) PCT Filed: Dec. 25, 2017

(86) PCT No.: PCT/JP2017/046320
§ 371 (c)(1),
(2) Date: Aug. 16, 2019

(87) PCT Pub. No.: WO2018/150734
PCT Pub. Date: Aug. 23, 2018

(65) Prior Publication Data
US 2019/0366613 A1      Dec. 5, 2019

(30) Foreign Application Priority Data

Feb. 16, 2017   (JP) .............................. JP2017-026509

(51) Int. Cl.
*B29C 48/07*      (2019.01)
*B29C 48/92*      (2019.01)
(Continued)

(52) U.S. Cl.
CPC .............. *B29C 48/07* (2019.02); *B29C 48/12* (2019.02); *B29C 48/301* (2019.02);
(Continued)

(58) Field of Classification Search
CPC ..... B29C 48/92; B29C 48/301; B29C 48/302; B29C 48/07; B29C 48/12; B29C 48/31;
(Continued)

(56) References Cited

U.S. PATENT DOCUMENTS 3,830,610 A      8/1974   Ohkawa et al.
4,428,896 A *    1/1984   Stevenson ............... B29C 48/35
                                                          264/40.1
(Continued)

FOREIGN PATENT DOCUMENTS

CN      103201083       7/2013
EP      1 211 049       6/2002
(Continued)

OTHER PUBLICATIONS

International Search Report for International Application No. PCT/JP2017/046320 dated Jan. 30, 2018, 4 pages, Japan.

*Primary Examiner* — Jeffrey M Wollschlager
(74) *Attorney, Agent, or Firm* — Thorpe North & Western

(57) ABSTRACT

A rubber extrusion device includes a sensor which detects a deviation from a preset reference position of a rubber extrudate extruded from an extrusion port. Based on this detection data, a control unit provides control for correction of the deviation by adjusting a position of a die relative to a head along a leading end surface of the head or a rotational speed of a screw. A rubber material is mixed and kneaded while being extruded forward by a screw installed inside a cylinder. Resultant unvulcanized rubber is fed into an extrusion flow path and extruded from the extrusion port formed in the die.

5 Claims, 10 Drawing Sheets

(51) Int. Cl.
  *B29C 48/31* (2019.01)
  *B29C 48/12* (2019.01)
  *B29C 48/30* (2019.01)

(52) U.S. Cl.
  CPC ............ *B29C 48/302* (2019.02); *B29C 48/31* (2019.02); *B29C 48/92* (2019.02); *B29C 2948/9258* (2019.02); *B29C 2948/92704* (2019.02); *B29C 2948/92885* (2019.02); *B29C 2948/92904* (2019.02)

(58) Field of Classification Search
  CPC .. B29C 2948/9258; B29C 2948/92704; B29C 2948/92885; B29C 2948/92904; B29C 2948/92076; B29C 2948/92171; B29C 2948/92295; B29C 2948/92409; B29C 2948/92447; B29C 2948/92571; B29C 2948/92609; B29C 2948/92666; B29C 2948/9279; B29C 48/505; B29B 7/726; B29B 7/728; B29B 7/7495; B29B 7/38; B29K 2021/00
  See application file for complete search history.

(56) References Cited

U.S. PATENT DOCUMENTS

| | | | | |
|---|---|---|---|---|
| 4,439,125 | A * | 3/1984 | Dieckmann | B29C 48/2556 425/140 |
| 4,515,738 | A * | 5/1985 | Anders | B29C 48/12 264/412 |
| 5,059,363 | A * | 10/1991 | Davis | B29C 48/19 264/412 |
| 5,066,435 | A * | 11/1991 | Lorenz | B29C 48/92 264/40.5 |
| 5,128,077 | A * | 7/1992 | Stevenson | B29C 48/92 264/410 |
| 5,843,349 | A * | 12/1998 | Anders | B29C 48/12 264/40.5 |
| 6,152,720 | A * | 11/2000 | Greb | B29C 48/07 425/147 |
| 6,491,510 | B1 | 12/2002 | Tieu et al. | |
| 2002/0063357 | A1* | 5/2002 | Ohki | B29C 48/07 264/177.16 |
| 2003/0051794 | A1* | 3/2003 | Suda | B26D 3/003 156/123 |
| 2009/0283203 | A1* | 11/2009 | Marchini | B29D 30/16 156/117 |
| 2010/0086732 | A1* | 4/2010 | Tamura | B60J 10/18 428/131 |
| 2013/0221557 | A1* | 8/2013 | Yonesato | B29C 43/08 264/40.6 |
| 2016/0361847 | A1* | 12/2016 | Ishida | B29C 43/34 |
| 2018/0133946 | A1* | 5/2018 | Neuss | B29C 48/92 |
| 2018/0147768 | A1* | 5/2018 | Ito | B29C 48/131 |
| 2020/0070454 | A1* | 3/2020 | Amurri | B29D 30/3028 |

FOREIGN PATENT DOCUMENTS

| | | |
|---|---|---|
| JP | S48-098562 | 11/1973 |
| JP | S50-020593 | 7/1975 |
| JP | H03-143609 | 6/1991 |
| JP | H08-178854 | 7/1996 |
| JP | 2002-103421 | 4/2002 |
| JP | 2008-126560 | 6/2008 |
| JP | 2009-061691 | 3/2009 |
| JP | 2009-119839 | 6/2009 |
| JP | 2011-194854 | 10/2011 |
| JP | 2012-091340 | 5/2012 |
| JP | 2013-216069 | 10/2013 |
| JP | 2014-172250 | 9/2014 |
| RO | 126104 | 3/2011 |
| WO | WO 2012/063891 | 5/2012 |

* cited by examiner

RUBBER EXTRUSION DEVICE AND METHOD FOR MANUFACTURING RUBBER EXTRUDATE

TECHNICAL FIELD

The present technology relates to a rubber extrusion device and a method for manufacturing a rubber extrudate and particularly relates to a rubber extrusion device capable of detecting and suppressing unintended curving of a rubber extrudate and a method for manufacturing a rubber extrudate.

BACKGROUND ART

In a case where a rubber product such as a tire is manufactured, an extrusion step is available in which unvulcanized rubber is extruded by a rubber extrusion device. A screw installed inside a rubber extrusion device plasticizes unvulcanized rubber and feeds plasticized unvulcanized rubber into an extrusion flow path formed in a head of the leading end. A die including an extrusion port with a desired shape is installed at the leading end of the head, and unvulcanized rubber passes through the extrusion port. A rubber extrudate provided with the desired shape is thus manufactured (for example, see Japan Unexamined Patent Publication Nos. 2008-126560, 2009-119839 and 2013-216069).

Different types of rubber have different rubber physical properties, and even for the same type of rubber, rubber physical properties vary among lots to some degree. In addition, extrusion conditions and the like vary among lots. Due to these variations, even in a case where the unvulcanized rubber is extruded using the same die, the rubber extrudate may be curved in an unintended direction with respect to the extrusion direction, preventing rubber extrudates with the desired shape from being obtained.

SUMMARY

The present technology provides a rubber extrusion device capable of detecting and suppressing unintended curving of a rubber extrudate and a method for manufacturing a rubber extrudate.

A rubber extrusion device of an embodiment of the present technology includes a cylindrical cylinder, a screw disposed in an internal space of the cylinder, a head installed at a leading end of the cylinder and including an extrusion flow path communicating with the internal space, and a die attached to the head at a leading end position of the extrusion flow path and including an extrusion port, wherein the rubber extrusion device includes a sensor detecting a deviation from a preset reference position of a rubber extrudate extruded from the extrusion port, and a control unit providing control for correction of the deviation based on detection data from the sensor to suppress curving of the rubber extrudate.

A method for manufacturing a rubber extrudate of an embodiment of the present technology includes feeding a rubber material into an internal space of a cylindrical cylinder, using a screw disposed in the internal space to extrude the rubber material forward, while mixing and kneading the rubber material, feeding resultant unvulcanized rubber into an extrusion flow path formed in a head located at a leading end of the cylinder, and extruding the unvulcanized rubber from an extrusion port as a rubber extrudate, the extrusion port being formed in a die attached to the head at a leading end of the extrusion flow path, wherein the method includes detecting, by a sensor, a deviation from a preset reference position of the rubber extrudate extruded from the extrusion port, and by providing, by a control unit, control for correction of the deviation based on detection data from the sensor, extruding the unvulcanized rubber such that the unvulcanized rubber passes through the extrusion flow path and exits through the extrusion port, reducing an amount of curving of the rubber extrudate with respect to an extrusion direction.

According to an embodiment of the present technology, the sensor detects the deviation from the preset reference position of the rubber extrudate extruded from the extrusion port. The detection data allows a curving state of the rubber extrudate (curving direction and the amount of curving) to be determined. Based on the detection data, the control unit provides control for correction of the deviation to extrude the unvulcanized rubber such that the unvulcanized rubber passes through the extrusion flow path and exits through the extrusion port. This allows suppression of unintended curving of the rubber extrudate with respect to the extrusion direction.

DETAILED DESCRIPTION

Figure 1:
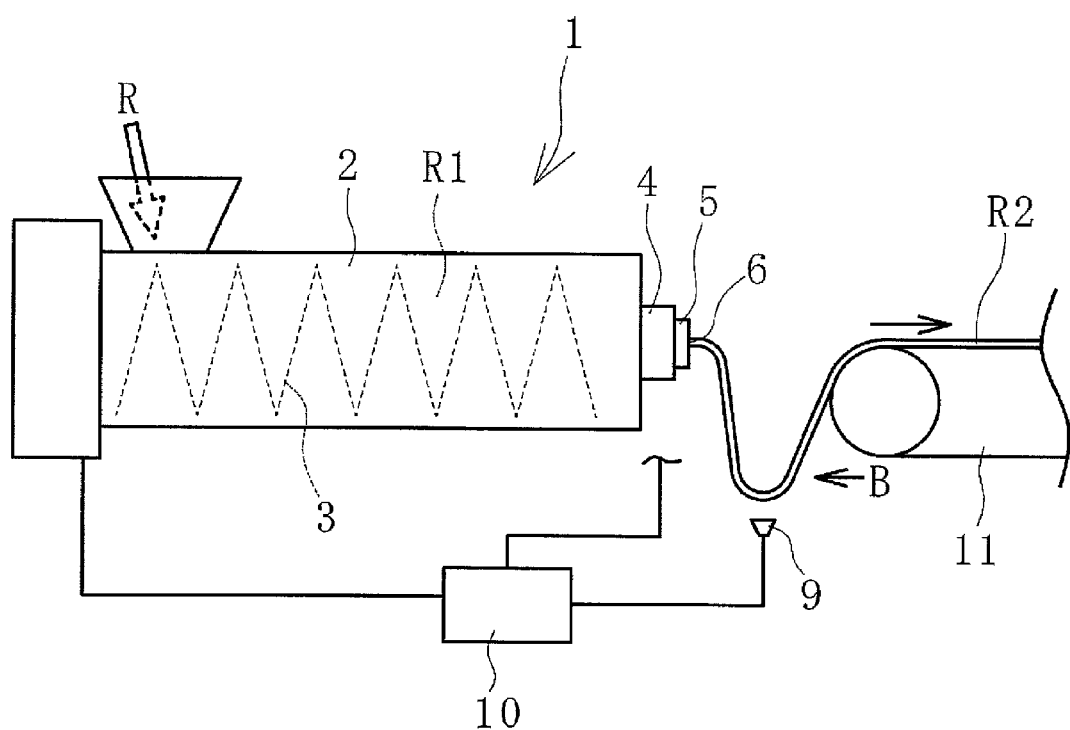
FIG. 1 is an explanatory diagram schematically illustrating a rubber extrusion device of an embodiment of the present technology in a side view.

A rubber extrusion device and a method for manufacturing a rubber extrudate according to an embodiment of the present technology will be described below based on illustrated embodiments.

A rubber extrusion device 1 of an embodiment of the present technology illustrated in FIGS. 1 to 4 includes a cylindrical cylinder 2, a screw 3 disposed inside the cylinder 2, a head 4 disposed at a leading end of the cylinder 2, and a control unit 10 that controls a rotational speed of the screw 3. A die 5 with an extrusion port 6 is attached to the head 4.

The rubber extrusion device 1 includes a moving unit 7 that moves the die 5 at least in a uniaxial direction relative to the head 4 along a leading end surface of the head 4, and a sensor 9. Detection data from the sensor 9 is input to the control unit 10, and operation of the moving unit 7 is controlled by the control unit 10. Note that in FIG. 1, the moving unit 7 and the like are omitted and not illustrated.

The rubber extrusion device 1 of the present embodiment further includes a conveyor device 11 disposed in front of the die 5 to convey, to a next step, a rubber extrudate R2 extruded from the extrusion port 6. The rubber extrudate R2 is placed in a hanging position between the extrusion port 6 and the conveyor device 11. The rubber extrudate R2 located in the hanging position is conveyed downstream by the conveyor device 11.

In the drawings, the direction of arrow X and the direction of arrow Y are each illustrated as a uniaxial direction along the leading end surface of the head 4. The direction of arrow X is the lateral direction (width direction) of the head 4, and the direction of arrow Y is the vertical direction (height direction) of the head 4. The direction of arrow X and the direction of arrow Y are orthogonal to each other. It is sufficient that the uniaxial direction extends along the leading end surface of the head 4. Accordingly, the uniaxial direction is not limited to the direction of arrow X or the direction of arrow Y, and may extend obliquely along the leading end surface of the head 4.

Figure 4:
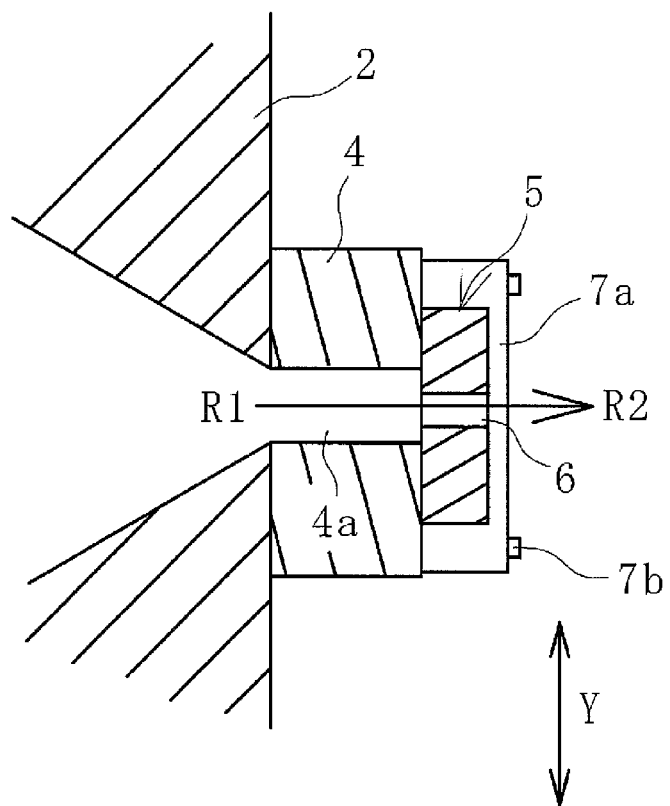
FIG. 4 is an explanatory diagram illustrating inside of the periphery of the head in a cross-sectional view taken along A-A of FIG. 2.

As illustrated in FIG. 4, at a leading end portion of the cylinder 2, an internal space is narrower toward the front. The head 4 includes an extrusion flow path 4a penetrating the head 4 in the longitudinal direction, and the extrusion flow path 4a is in communication with the internal space of the cylinder 2.

Figure 2:
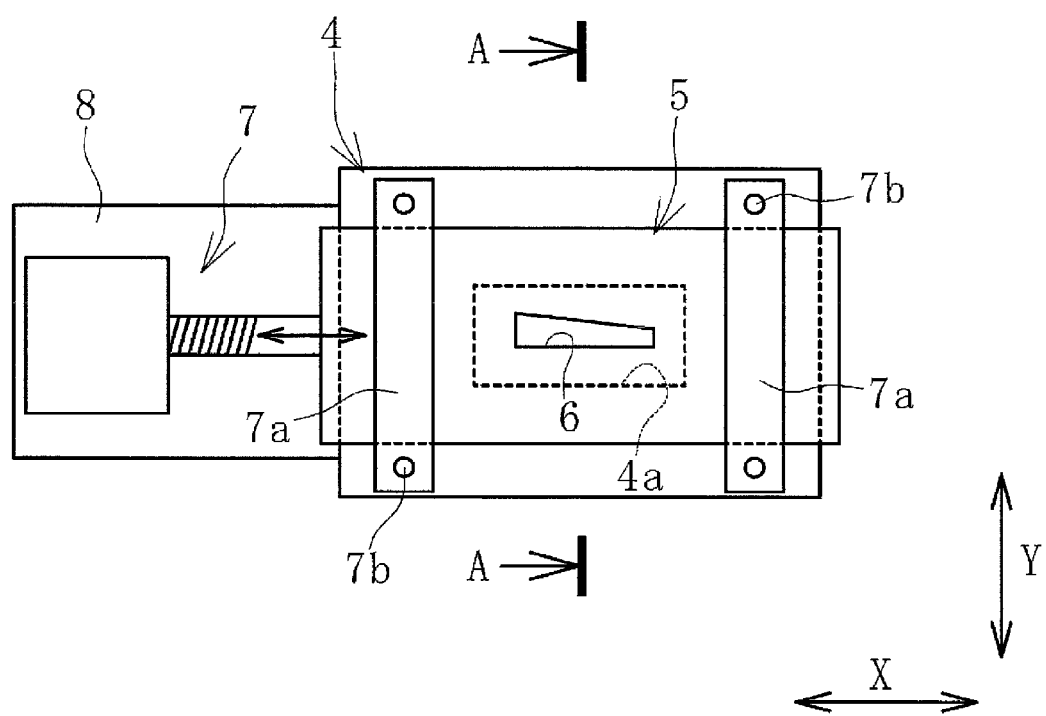
FIG. 2 is an explanatory diagram illustrating a periphery of a head of FIG. 1 in a front view.
Figure 3:
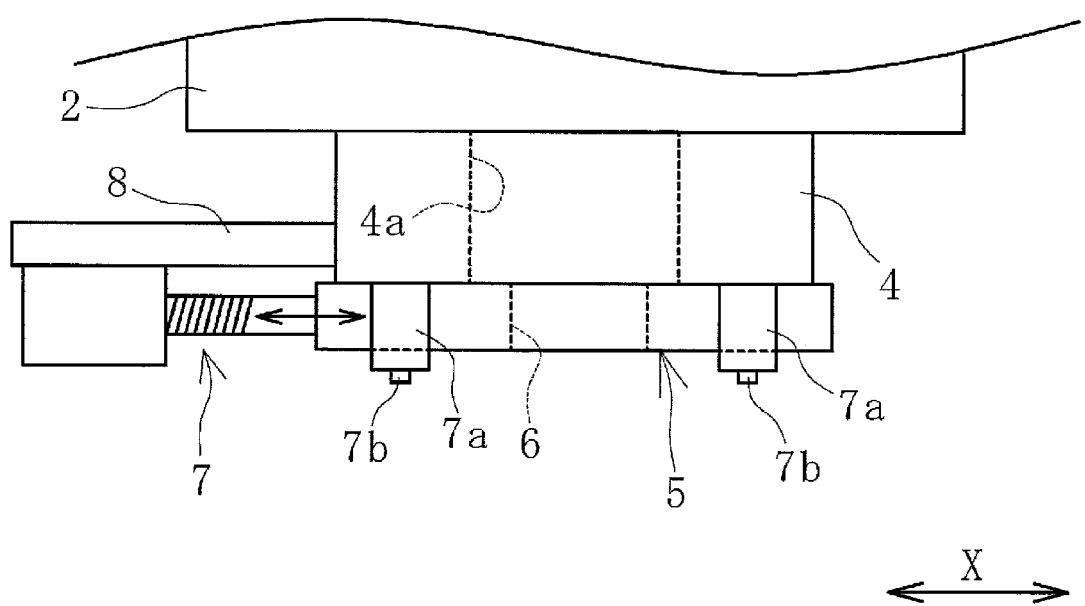
FIG. 3 is an explanatory diagram illustrating the periphery of the head of FIG. 1 in a plan view.

The die 5 is attached to a leading end position of the extrusion flow path 4a of the head 4. In the embodiment, the extrusion port 6 penetrating the die 5 in the longitudinal direction is shaped, in a front view, like a trapezoid extending in the lateral direction of the head 4 as illustrated in FIG. 2. The extrusion port 6 has a laterally asymmetrical shape. Since the extrusion flow path 4a and the extrusion port 6 are in communication, unvulcanized rubber R1 pushed through the internal space of the cylinder 2 into the extrusion flow path 4a is extruded to pass through the extrusion flow path 4a and exit through the extrusion port 6 as the rubber extrudate R2. The extrusion port 6 is not limited to this shape, and a desired shape such as a circle, an ellipse, a semicircle, a square, a rectangle, or the like is employed.

Two holding members 7a are fixed to the head 4 with a lateral spacing between the holding members 7a using fixing bolts 7b penetrating the respective holding members 7a in the longitudinal direction. The die 5 is held by the holding members 7a so as to be movable in the lateral direction with respect to the head 4.

A fixing plate 8 is mounted on a left side surface of the head 4 so as to protrude outward, and the moving unit 7 is installed on the fixing plate 8. In the embodiment, the moving unit 7 includes a servo motor and a ball screw rotated and moved in the axial direction by the servo motor, and a tip of the ball screw is connected to a left side surface of the die 5.

Besides, for example, a hydraulic cylinder or the like may be used as the moving unit 7. The installation location of the moving unit 7 is not limited to the left side of the head 4, and can be, for example, the right side of the head 4. Note that, instead of the structure in which the die 5 and the moving unit 7 are directly connected, a structure can be provided in which, for example, the moving unit 7 is connected to a frame body to which the dies 5 is attached.

Actuation of the moving unit 7 moves the ball screw back and forth in the lateral direction, and thus, the die 5 moves in the lateral direction with respect to the head 4. Correspondingly, in a front view, the position of the extrusion port 6 changes with respect to a leading end opening of the extrusion flow path 4a. The die 5 can be fixed at a desired moving position, and thus, the die 5 and the head 4 can be fixed at a desired relative position along the leading end surface of the head 4. The actuation of the moving unit 7 is controlled by the control unit 10 based on the detection data from the sensor 9. Thus, the die 5 is moved to and fixed at the desired position relative to the head 4 under the control of the control unit 10.

The sensor 9 detects a deviation d from a preset reference position C of the rubber extrudate R2 extruded from the extrusion port 6. The deviation d as used herein is, for example, an amount of shift from the reference position C in a direction orthogonal to the extrusion direction of the rubber extrudate R2 (for example, in the X direction or the Y direction). Alternatively, the deviation d as used herein can be the inclination, in the width direction of the rubber extrudate R2 from the reference position C at a position where the rubber extrudate R2 hangs down, or the magnitude of the surface irregularities of the rubber extrudate R2.

For example, an image sensor, a displacement sensor, or the like can be used as the sensor 9. Based on the detection data from the sensor 9, the control unit 10 provides control for correction of the deviation d to suppress curving of the rubber extrudate R2. Specifically, the deviation d is corrected by controlling the moving unit 7 to adjust the position of the die 5 with respect to the head 4 along the leading end surface of the head 4. Alternatively, the rotational speed of the screw 3 is controlled to correct the deviation d.

A procedure of a method for manufacturing a rubber extrudate according to an embodiment of the present technology will be described below.

In a case where the rubber extrudate R2 is manufactured by the rubber extrusion device 1, a predetermined amount of a rubber material R such as raw rubber and a compounding agent is fed into the internal space of the cylinder 2. The rubber material R is mixed and kneaded by the rotating screw 3. The unvulcanized rubber R1 extruded forward by the screw 3 is softened to some degree (plasticized) and fed into the extrusion flow path 4a. The unvulcanized rubber R1 then passes through the extrusion flow path 4a.

The leading end opening area of the extrusion flow path 4a is partially covered by the die 5, and the unvulcanized rubber R1 is extruded from the extrusion port 6 with the desired shape. Thus, the rubber extrudate R2 provided with a desired cross-sectional shape is manufactured. For example, the rubber extrudate R2, such as a strip-like tire member provided with a predetermined shape, is manufactured according to an embodiment of the present technology. The rubber extrudate R2 is extruded while being conveyed to the next step by the transfer conveyor device 11.

Figure 5:
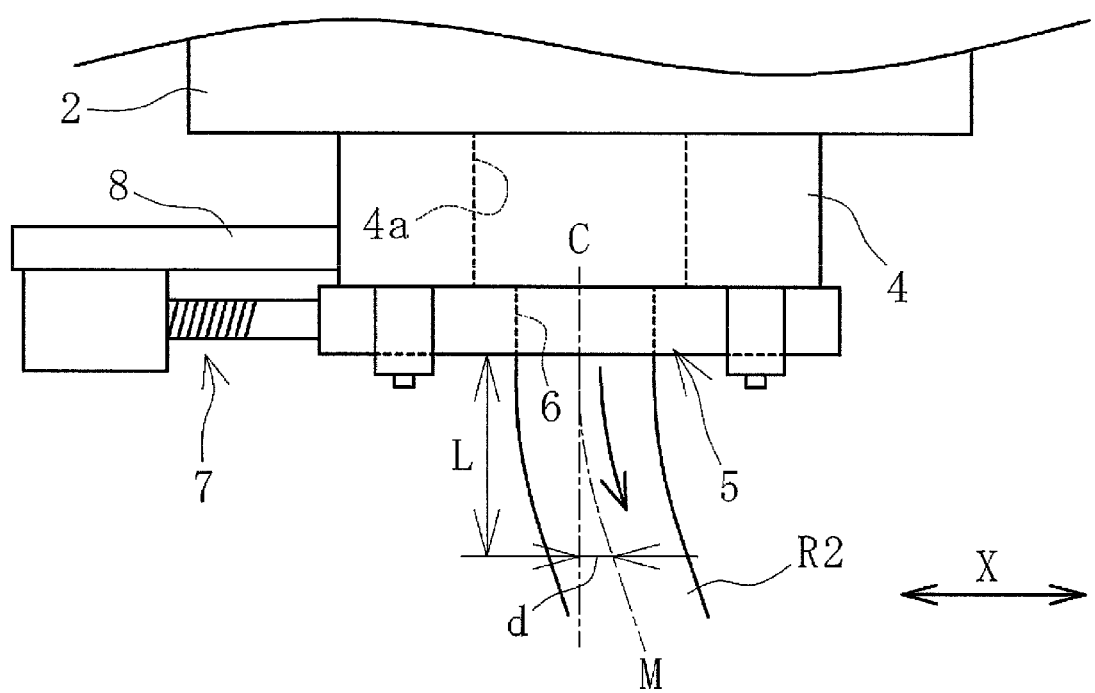
FIG. 5 is an explanatory diagram illustrating a state in which a rubber extrudate is extruded, with a die of FIG. 3 disposed in the center of the head in the lateral direction.

In a case where the unvulcanized rubber R1 varies in rubber physical properties or due to extrusion conditions or the like, the rubber extrudate R2 may be curved in an unintended direction (lateral direction or vertical direction) as illustrated in FIG. 5 even in a case where the rubber extrudate is extruded from the extrusion port 6 with the same shape. Note that, in FIGS. 5 to 7, the center position of the extrusion port 6 in the lateral direction (width direction) is indicated by a dot-dash line C as the reference position C, and the center position of the rubber extrudate R2 in the lateral direction (width direction) is indicated by a dot-dash line M.

In FIG. 5, at a position located at a forward distance L from the die 5, the lateral center position M of the rubber extrudate R2 is shifted rightward with respect to the reference position C, and the rubber extrudate R2 is curved rightward (has a deviation d). In the embodiment, the deviation d is defined by the amount of lateral shift of the lateral center position M of the rubber extrudate R2 relative to the reference position C of the rubber extrudate R2 at a position located at the forward distance L from the die 5. The amount of lateral shift is successively detected by the sensor 9 as the deviation d.

Curving of the rubber extrudate R2 in a specific direction as illustrated in FIG. 5 instead of straight extrusion is expected to be caused by a combination of various factors such as a variation in the rubber physical properties of the unvulcanized rubber R1, and extrusion conditions (pressure, temperature, flow velocity, and the like), matching between the cylinder 2 and the screw 3, and the like. The present technology utilizes a change in the manner of curving (the amount or direction of curving) of the rubber extrudate R2 effected by varying the relative position between the extrusion flow path 4a and the extrusion port 6 in a front view or changing the rotational speed of the screw 3. Particularly, in a rubber extrusion device 1 including a plurality of screws 3, such as a twin screw type including two screws 3, changing the rotational speed of each screw 3 is effective for changing the manner of curving of the rubber extrudate R2.

Figure 6:
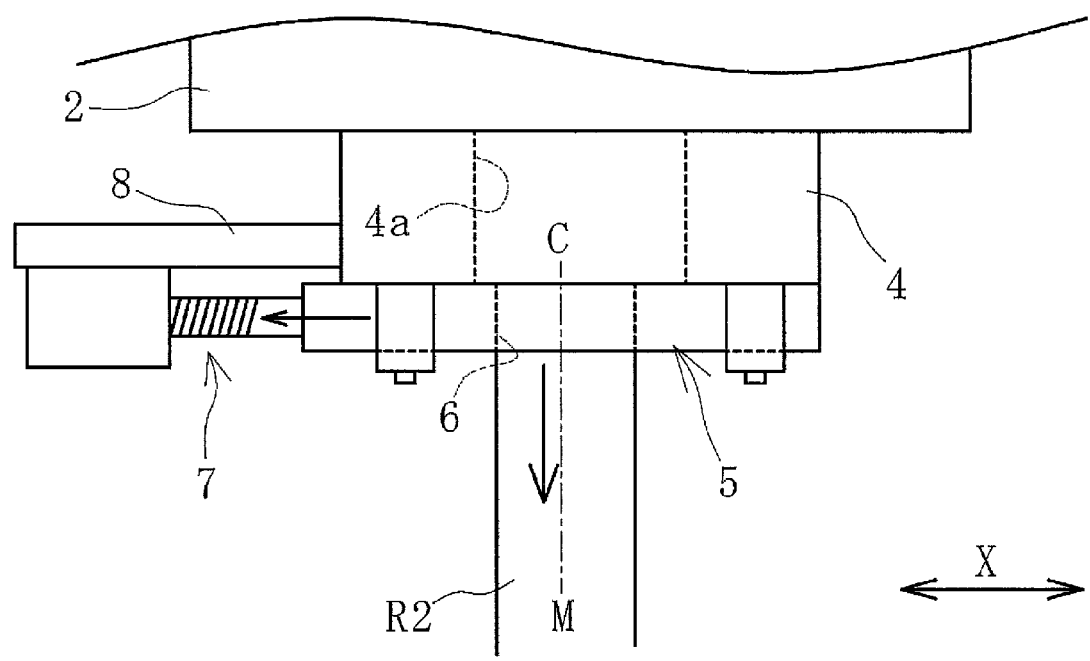
FIG. 6 is an explanatory diagram illustrating a state in which the rubber extrudate is extruded, with the die of FIG. 5 moved leftward with respect to the head.

Thus, in an embodiment of the present technology, the die 5 positioned as illustrated in FIG. 5 is moved leftward with respect to the head 4, as illustrated in FIG. 6. Such a change in the relative position between the extrusion flow path 4a and the die 5 in a front view changes a pressure distribution (fluid flow distribution) of the unvulcanized rubber R1 passing through the extrusion flow path 4a and then through the extrusion port 6. Correspondingly, a leftward curving force acts on the rubber extrudate R2 to allow the manner of curving of the rubber extrudate R2 to be adjusted.

Figure 7:
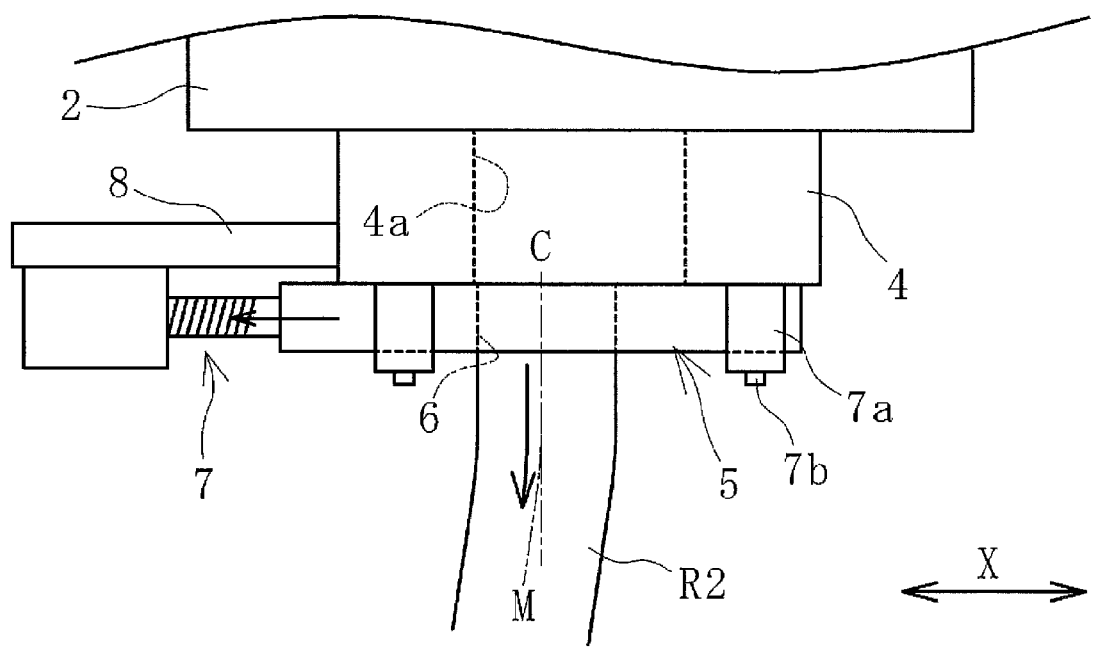
FIG. 7 is an explanatory diagram illustrating, in a plan view, a state in which the rubber extrudate is extruded at a position where the die of FIG. 6 has been moved further leftward with respect to the head.

In a case where the die 5 is moved further leftward with respect to the head 4 as illustrated in FIG. 7, the leftward curving force acting on the rubber extrudate R2 becomes excessively strong, thus curving the rubber extrudate R2 leftward. Thus, in an embodiment of the present technology, based on detection data from the sensor 9, the control unit 10 successively controls the position of the die 5 (the relative position between the die 5 and the head 4 along the leading end surface of the head 4) to make the deviation d closer to zero (the control unit 10 provides feedback control). The deviation d of the rubber extrudate R2 is largest at a position located at a distance L of approximately 500 mm, and thus, the sensor 9 detects the deviation d, for example, at a position located at a distance L of 400 mm to 600 mm.

This control is provided to appropriately adjust the relative position between the extrusion flow path 4a and the extrusion port 6 in a front view. A fixed state as illustrated in FIG. 6 is thus established, and the rubber extrudate R2 is extruded. In other words, by moving the die 5 relative to the head 4 along the leading end surface of the head 4 such that the rubber extrudate R2 is curved in a direction opposite to the direction of unintended curving, the unintended curving of the rubber extrudate R2 can be suppressed. As a result, the curving of the rightward curved rubber extrudate R2 is corrected, enabling obtainment of a rubber extrudate R2 provided with a desired straight shape corresponding to the shape of the extrusion port 6.

Alternatively, based on the detection data from the sensor 9, the control unit 10 provides control for an increase or a reduction in the rotational speed of the screw 3 to make the deviation d closer to zero. Providing this control changes the pressure distribution (fluid flow distribution) of the unvulcanized rubber R1 passing through the extrusion flow path 4a and then through the extrusion port 6, correcting the curving of the rubber extrudate R2.

Thus, according to an embodiment of the present technology, even in a case where a variation attributed to rubber physical properties or extrusion conditions or the like occurs, the rubber extrudate R2 having a desired shape inhibited from being unintentionally curved can be stably manufactured by controlling the relative position between the die 5 and the head 4 along the leading end surface of the head 4 or by controlling the rotational speed of the screw 3. Additionally, an embodiment of the present technology eliminates or minimizes a need for excess work performed in the related art to modify the shape of the die 5 by machining or adjust the extrusion conditions or the like in each case of a variation attributed to the rubber physical properties or the extrusion conditions or the like. This is advantageous in improving the productivity of the rubber extrudate R2. Moreover, providing the moving unit 7 moving the die 5 to the leading end position of the extrusion flow path 4a is not a major modification, and thus, the moving unit 7 can be easily applied to existing rubber extruders.

The reference position C for calculation of the deviation d and the portion to be compared with the reference position C are not limited to the reference position C and the portion illustrated in the embodiment, and can be set as appropriate. For example, the deviation d can be calculated by setting a left end position of the rubber extrudate R2 as the reference position C and comparing the reference position C with the left end position of the extrusion port 6.

Figure 8:
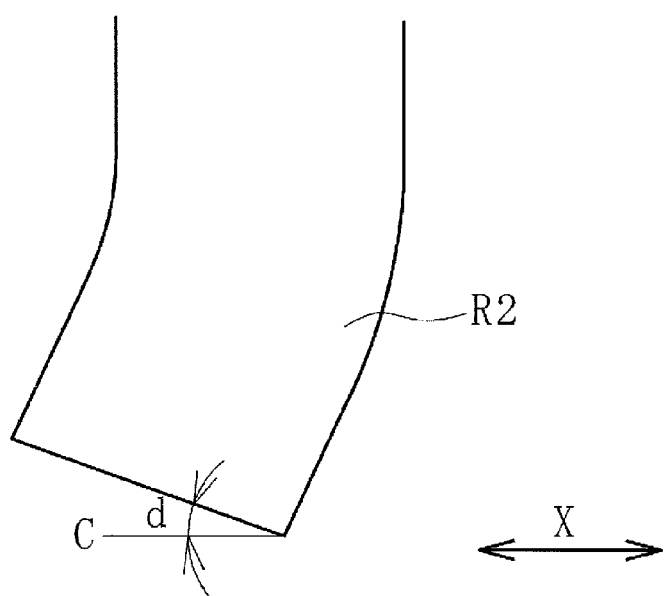
FIG. 8 is an explanatory diagram schematically illustrating the inclination, in the width direction, of the rubber extrudate located in a hanging position as viewed in the direction of arrow B in FIG. 1.

Additionally, the deviation d detected by the sensor 9 is not limited to the amount of shift of the rubber extrudate R2 in the direction orthogonal to the extrusion direction with respect to the reference position C. For example, as shown in FIG. 8, the deviation d can be defined as the inclination, in the width direction, of the rubber extrudate R2 located in the hanging position between the extrusion port 6 and the conveyor device 11.

In a case where the rubber extrudate R2 is curved in the width direction, the rubber extrudate R2 is inclined in the width direction at the position where the rubber extrudate R2 hangs down. Thus, in FIG. 8, the reference position C is set in the horizontal direction in advance, and the deviation d is defined as the magnitude of the inclination from the reference position C. Note that, instead of the inclination of the rubber extrudate R2 in the width direction, the deviation d may be defined as a vertical difference between the lowest positions of both ends of the rubber extrudate R2 in the width direction.

Figure 9:
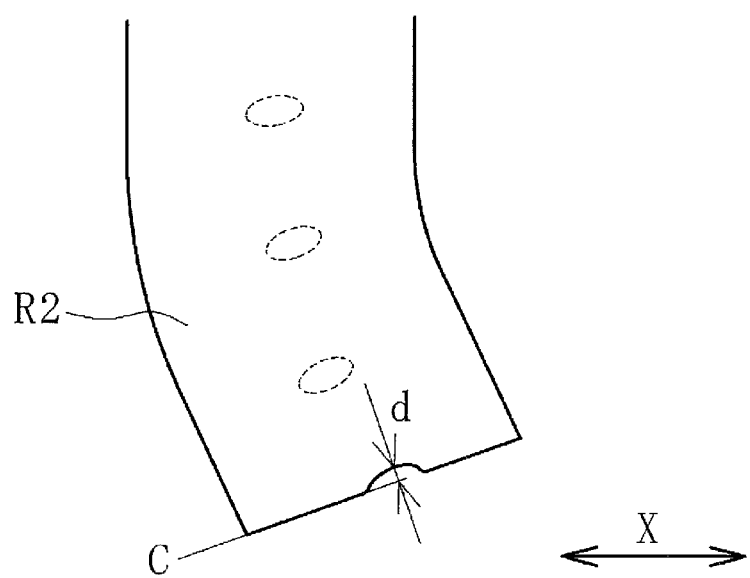
FIG. 9 is an explanatory diagram schematically illustrating surface irregularities of the rubber extrudate located in the hanging position as viewed in the direction of arrow B in FIG. 1.

As illustrated in FIG. 9, the deviation d can be defined as the magnitude of the surface irregularities of the rubber extrudate R2 located in the hanging position between the extrusion port 6 and the conveyor device 11. In FIG. 9, circular portions indicated by dashed lines correspond to recess portions, and protrusion portions are formed between the recess portions. Note that, in FIG. 9, the curve direction of the rubber extrudate R2 is illustrated opposite to the curve direction in FIG. 8.

In a case where the rubber extrudate R2 is curved in the width direction, recesses/protrusions may be continuously formed on the surface of the rubber extrudate R2 in the longitudinal direction. Thus, in FIG. 9, the reference position C is set on a line connecting the lowest positions of both ends, in the width direction, of the rubber extrudate R2 located in the hanging position, and the deviation d is defined as the maximum depth of the recess portion from the reference position C or as the maximum height of the protrusion portion from the reference position C.

In a case where the rubber extrudate R2 used, for example, as a tire component is manufactured using an embodiment of the present technology, the rubber extrudate R2 can have the desired shape inhibited from being unintentionally curved. Thus, manufacturing a tire using the rubber extrudate R2 is advantageous in improving the uniformity of the tire.

For the control for movement of the die 5 relative to the head 4 along the leading end surface of the head 4 and the control for the rotational speed of the screw 3, both of these operations can be simultaneously performed or one of the operations can be exclusively separately performed. A change in the rotational speed of the screw 3 affects the production speed of the rubber extrudate R2, and thus, for example, priority is given to the control for movement of the die 5 relative to the head 4. In a case where the curving of the rubber extrudate R2 is not successfully sufficiently corrected simply by this control, the control for the rotational speed of the screw 3 is additionally provided.

In a case where there is some accumulation of correlation data, for a plurality of rubber types, indicating the relationship between the extrusion conditions, the deviation d, and the amount of control required to correct the deviation d (the relative position between the die 5 and the head 4 along the leading end surface of the head 4 or the rotational speed of the screw 3), the correlation data is preliminarily input to the control unit 10. In a case where extrusion of the rubber extrudate R2 is started, the rubber extrusion device can be brought into a preset state by inputting the rubber physical properties of the rubber extrudate R2 and the like to the control unit 10, and based on these data and the correlation data described above, which has been acquired and input in advance, placing the die 5 at a predetermined position with respect to the head 4 and setting the rotational speed of the screw 3 to a predetermined value.

In an initial period of extrusion start, the rubber extrudate R2 is extruded in this preset state to allow the deviation d to be corrected to prevent the rubber extrusion R2 from being unintentionally curved. Thereafter, the feedback control described above is used to provide the control for movement of the die 5 relative to the head 4 along the leading end surface of the head 4 or the control for the rotational speed of the screw 3.

In a case where the uniaxial direction in which the die 5 is moved relative to the head 4 is set in the extension direction of the extrusion port 6 (the direction in which the extrusion port 6 extends the longest in a front view) as in the embodiment, a significant change is easily made to the pressure distribution (fluid flow distribution) of the unvulcanized rubber R1 passing through the extrusion flow path 4a and then through the extrusion port 6. Thus, the unintended curving of the rubber extrudate R2 is easily suppressed.

In the embodiment, the so-called single-screw type rubber extrusion device 1 including the single screw 3 has been illustrated, but an embodiment of the present technology can also be applied to a twin-screw type extrusion device 1 including two screws 3 or a triple-screw type rubber extrusion device 1.

Figure 10:
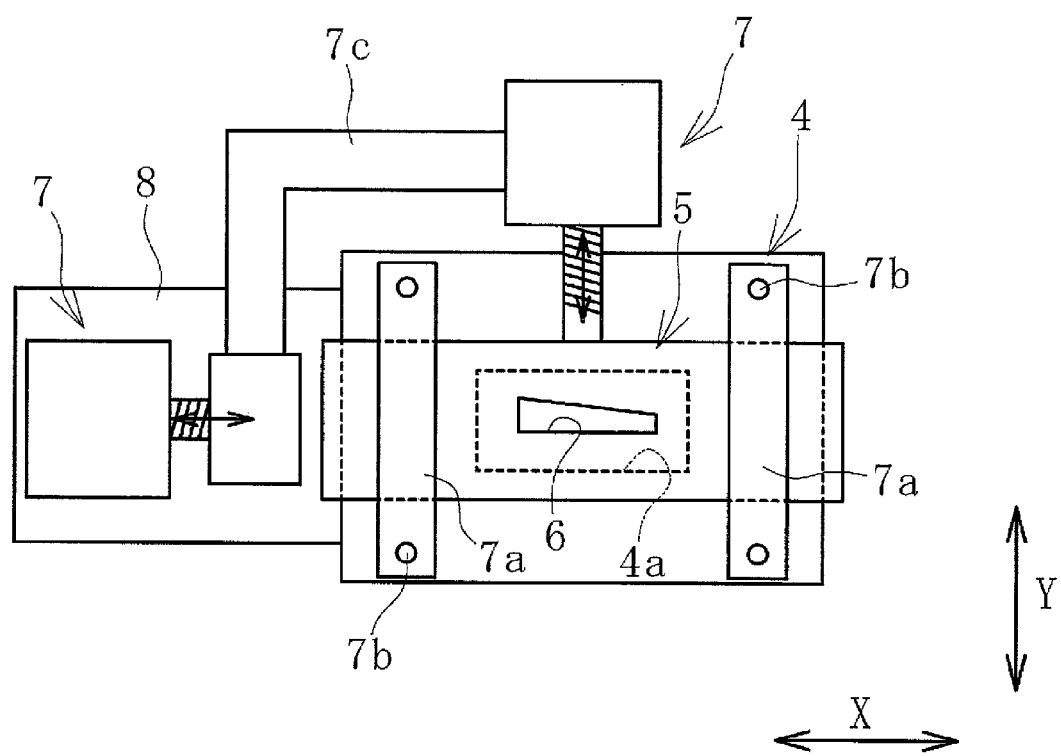
FIG. 10 is an explanatory diagram illustrating another embodiment of a rubber extrusion device in a front view.

In another embodiment of the rubber extrusion device 1 illustrated in FIG. 10, the die 5 is configured to be movable not only in the lateral direction but also in the vertical direction relative to the head 4 along the leading end surface of the head 4. Specifically, the moving unit 7 is disposed above the head 4. The moving unit 7 includes a servo motor and a ball screw rotated and moved in the axial direction by the servo motor, and a tip of the ball screw is connected to an upper surface of the die 5. The moving unit 7 is connected by a connecting arm 7c to another moving unit 7 disposed on the left side of the head 4. The die 5 is held by the holding member 7a so as to be movable in the lateral direction and the vertical direction with respect to the head 4.

The moving unit 7 disposed on the left side of the die 5 moves the die 5 and the moving unit 7 disposed above the die 5 via the connecting arm 7c, in the lateral direction with respect to the head 4 along the leading end surface of the head 4. Accordingly, in the embodiment, the die 5 is movable in a discretionary direction relative to the head 4 along the leading end surface of the head 4.

In the embodiment, further detailed changes can be made to the pressure distribution (fluid flow distribution) of the unvulcanized rubber R1 passing through the extrusion flow path 4a and then through the extrusion port 6. This allows the manner of curving of the rubber extrudate R2 to be more specifically adjusted. Thus, the unintended curving of the rubber extrudate R2 can be reliably suppressed with greater accuracy.

The various specifications described above in the embodiments can also be applied to the present embodiment.

The invention claimed is:

1. A rubber extrusion device comprising a cylindrical cylinder, a screw disposed in an internal space of the cylinder, a head disposed at a leading end of the cylinder and including an extrusion flow path communicating with the internal space, and a die attached to the head at a leading end position of the extrusion flow path and including an extrusion port, wherein
    the rubber extrusion device comprises a sensor detecting a deviation from a preset reference position of a rubber extrudate extruded from the extrusion port, and a control unit providing control for correction of the deviation based on detection data from the sensor to suppress a curvature of the rubber extrudate in a width direction, and a moving unit moving the die relative to the head at least in a uniaxial direction along a leading end surface of the head,
    the rubber extrudate is placed in a hanging position and then conveyed downstream, and the deviation is an inclination, in the width direction, of the rubber extrudate located in the hanging position or a magnitude of surface irregularities of the rubber extrudate, and
    the moving unit is controlled by the control unit to correct the deviation.

2. The rubber extrusion device according to claim 1, wherein a rotational speed of the screw is controlled by the control unit to correct the deviation.

3. The rubber extrusion device according to claim 1, wherein, while the rubber extrudate is being extruded, the sensor successively detects the deviation and the control unit successively provides control for correction of the deviation.

4. The rubber extrusion device according to claim 1, wherein, for a plurality of rubber types, correlation data indicating a relationship between extrusion conditions, the deviation, and an amount of control for correction of the deviation is acquired and stored in the control unit in advance, and in an initial period of extrusion of the rubber extrudate, control for correction of the deviation is provided based on the rubber type of the rubber extrudate to be extruded, the extrusion conditions, and the correlation data to suppress curving of the rubber extrudate in the width direction.

5. A method for manufacturing a rubber extrudate, the method comprising feeding a rubber material into an internal space of a cylindrical cylinder, using a screw disposed in the internal space to extrude the rubber material forward, while mixing and kneading the rubber material, feeding resultant unvulcanized rubber into an extrusion flow path formed in a head installed at a leading end of the cylinder, and extruding the unvulcanized rubber from an extrusion port as a rubber extrudate, the extrusion port being formed in a die attached to the head at a leading end of the extrusion flow path, wherein the method comprises detecting, by a sensor, a deviation from a preset reference position of the rubber extrudate extruded from the extrusion port, and by providing, by a control unit, control for correction of the deviation based on detection data from the sensor, extruding the unvulcanized rubber such that the unvulcanized rubber passes through the extrusion flow path and exits through the extrusion port, reducing an amount of curving of the rubber extrudate in a width direction with respect to an extrusion direction the method further comprising moving the die relative to the head at least in a uniaxial direction along a leading end surface of the head, and placing the rubber extrudate in a hanging position to be conveyed downstream, wherein the deviation is an inclination, in the width direction, of the rubber extrudate in the hanging position or a magnitude of surface irregularities of the rubber extrudate, and the moving of the die is controlled by the control unit to correct the deviation.

\* \* \* \* \*